United States Patent
Kurogo et al.

(10) Patent No.: US 7,238,142 B2
(45) Date of Patent: Jul. 3, 2007

(54) LOCK-UP CAPACITY CONTROL APPARATUS AND METHOD FOR TORQUE CONVERTER

(75) Inventors: Nobuo Kurogo, Kanagawa (JP); Tatsuya Imamura, Tokyo (JP); Kouji Saitou, Kanagawa (JP); Aki Hayakawa, Tokyo (JP); Koji Dohi, Tokyo (JP); Toshiji Iida, Kanagawa (JP); Hiroshi Sekiya, Kanagawa (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 240 days.

(21) Appl. No.: 11/126,329

(22) Filed: May 11, 2005

(65) Prior Publication Data

US 2005/0261111 A1    Nov. 24, 2005

(30) Foreign Application Priority Data

May 20, 2004    (JP) .............................. 2004-150307

(51) Int. Cl.
  *F16H 61/14* (2006.01)
(52) U.S. Cl. ..................................... 477/180; 477/168
(58) Field of Classification Search ................. 477/61, 477/62, 64, 65, 70, 86, 168, 169, 180; 192/3.31
  See application file for complete search history.

(56) References Cited

U.S. PATENT DOCUMENTS

| | | | |
|---|---|---|---|
| 5,616,099 A * | 4/1997 | Sakai ......................... | 477/169 |
| 5,743,828 A * | 4/1998 | Kuriyama et al. .......... | 477/169 |
| 6,217,481 B1 * | 4/2001 | Watanabe et al. ........... | 477/169 |
| 6,942,597 B2 * | 9/2005 | Segawa et al. ............... | 477/62 |
| 2002/0173404 A1 * | 11/2002 | Takatori et al. ............... | 477/53 |
| 2002/0175036 A1 * | 11/2002 | Takatori et al. .............. | 192/3.3 |
| 2003/0060330 A1 * | 3/2003 | Sato et al. .................. | 477/174 |

FOREIGN PATENT DOCUMENTS

JP    2002-106707 A    4/2002

* cited by examiner

*Primary Examiner*—Sherry Estremsky
*Assistant Examiner*—Edwin A. Young
(74) *Attorney, Agent, or Firm*—Foley & Lardner LLP

(57) ABSTRACT

In lock-up capacity control apparatus and method for a torque converter, the torque converter is caused to have a converter state in which a relative revolution between input and output elements of the torque converter is free of limitation in a case where a lock-up capacity (L/Uprso) during a no-load state is equal to or larger than a shock determining lock-up capacity (α), during an acceleration slip lock up in which the lock-up capacity of the torque converter is augmented by means of a time series control which accords with a load state of an engine, and the torque converter is caused to be oriented toward a lock-up state in which the relative revolution is zeroed by continuing an augmentation of the lock-up capacity by means of the time series control in a case where the lock-up capacity during the no-load state is smaller than the shock determining lock-up capacity.

16 Claims, 6 Drawing Sheets

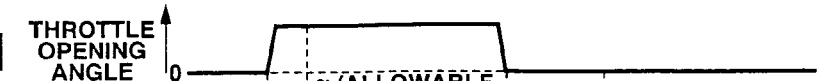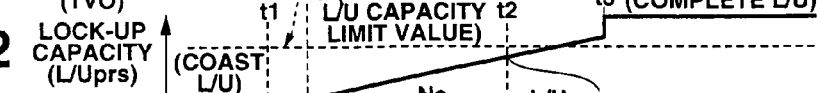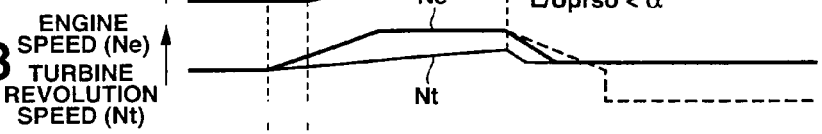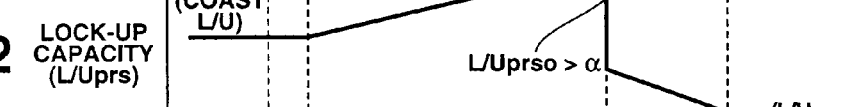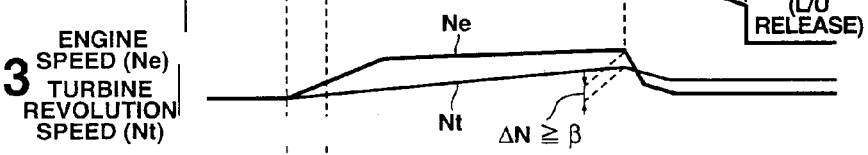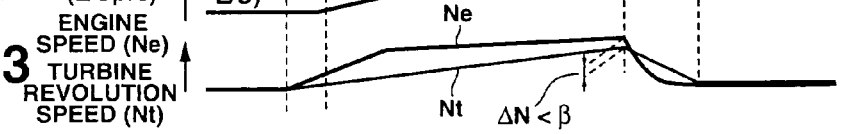

LOCK-UP CAPACITY CONTROL APPARATUS AND METHOD FOR TORQUE CONVERTER

BACKGROUND OF THE INVENTION

1. Field of the Invention

The present invention relates to lock-up capacity control apparatus and method for a torque converter in which a lock-up capacity of the torque converter is appropriately controlled when an engine is switched to a no-load state during an acceleration slip lock up in which the lock-up capacity of the torque converter is augmented by means of a time series control in accordance with a load state of the engine.

2. Description of the Related Art

Since a torque converter performs a power transmission under a torque augmentation and under a torque variation absorption along with a relative revolution (a slip) between input and output elements of the torque converter, a smooth power transmission can be achieved but a transmission efficiency is reduced. Therefore, many of lock-up type torque converters have been used in each of which the relative revolution (the slip) between the input and output elements of the torque converter is limitable during a low-load, high-speed power transmission in which the torque augmentation function and the torque variation absorption function are not required. Then, in order to enhance the transmission efficiency of the torque converter and to improve a fuel consumption of an engine which constitutes a vehicular power train together with the torque converter and an automatic transmission, it is effective to expand a lock-up vehicle speed region in which a direct coupling (lock up) between the input and output elements of the torque converter is carried out to limit the relative revolution (slip) between the input and output elements to a low vehicle speed at all possible, along with an extension of a fuel supply cut-off time due to a reduction suppression of an engine revolution at a time of no-load of the engine. Especially, in a case where the automatic transmission is a continuously variable transmission such as a toroidal continuously variable transmission or V-belt continuously variable transmission, it is possible to remarkably reduce a lock-up release vehicle speed to a lower vehicle speed. The improvement of the fuel consumption due to the expansion of the lock-up vehicle speed region becomes remarkable. On the other hand, the reduction of the lock-up release vehicle speed to the low vehicle speed raises the following problems. That is to say, when a drive wheel has a tendency of lock due to an abrupt braking of the vehicle, a driving stop of the engine (an engine stalling) occurs unless a quick release of the lock up of the torque converter is carried out since the drive wheel having the tendency of lock is directly coupled with the engine. In a case where the lock-up release vehicle speed is set to be low, the torque converter is in a lock-up state up to the low vehicle speed. The drive wheel becomes the tendency of lock and it becomes difficult to release the lock up of the torque converter before the engine stalling occurs and it becomes difficult to avoid a problem of the engine stalling when the abrupt braking occurs.

A Japanese Patent Application First Publication No. 2002-106707 published on Apr. 10, 2002 exemplifies a previously proposed lock-up control apparatus in which, during a coast lock-up capacity control in which, during a coast running with an accelerator pedal released (engine no-load state) carried out before a vehicle braking, a lock-up capacity of the torque converter is, although the lock-up capacity is different according to a coast running torque, reduced to a capacity immediately before the torque converter slips by means of a learning control is proposed. According to this coast lock-up capacity control technique, since the coast lock-up capacity is small, a lock-up release response of the torque converter can accordingly be higher. Even if the drive wheel becomes the lock tendency due to the abrupt braking of the vehicle, a quick lock-up release of the torque converter can avoid an occurrence of the engine stalling. However, in the coast lock-up capacity control technique, a transmission torque becomes large when a re-acceleration with the accelerator pedal depressed is carried out so that the slip occurs in the torque converter due to an insufficient lock-up capacity and an engine racing occurs. Therefore, during such a re-acceleration as described above, as described in the above-identified Japanese Patent Application First Publication, an acceleration slip lock up in which the lock-up capacity of the torque converter is gradually augmented (increased) by means of a predetermined time series (ramp) control is proposed.

SUMMARY OF THE INVENTION

However, when the release of the accelerator pedal during the lock-up capacity time series augmentation control (the acceleration slip lock up) along with the re-acceleration causes no-load state of the engine and causes the vehicular running to be switched into the coast running, an abrupt reduction of the transmission torque causes the lock-up capacity to be excessively large so that the torque converter is abruptly switched from a slip state to a lock-up state. Thus, a lock-up shock occurs. To solve this problem of the lock-up shock, on the basis of a general thinking on the lock-up capacity control, it is an usual practice that, in a case where the engine is switched into the no-load state (coast running) due to the release of the accelerator pedal during the time series augmentation control (the acceleration slip lock up) of the lock-up capacity along with the re-acceleration, the augmentation time series control of the lock-up capacity is stopped and the torque converter is caused to have a converter state in which the relative revolution between the input and output elements of the torque converter is not limited (free of limitation). However, the above-described common sense measure has the following problems. That is to say, if, when the engine is switched into the no-load state (coast running) due to a release of the accelerator pedal during the time series augmentation control of the lock-up capacity along with the re-acceleration, the torque converter is unconditionally caused to have the converter state, the time series augmentation control (the acceleration slip lock up) along with the re-acceleration is stopped even under a condition that the problem of the lock-up shock does not occur. Thus, together with a stop of the fuel supply cut-off (a fuel recovery) due to an abrupt reduction of the engine revolution, a worsening of the fuel consumption is introduced. In addition, if the torque converter is unconditionally caused to have the converter state, the engine racing occurs and a, so-called, direct (driving) sensation is lost due to a response delay to the acceleration during a twice acceleration of an again depression of the accelerator pedal after the torque converter is caused to have the converter state. Especially, this provides an important problem to be solved for a vehicle in which the continuously variable transmission is mounted for which the direct sensation is an essential feature.

It is, therefore, an object of the present invention to provide lock-up capacity control apparatus and method for a torque converter which, on the basis of a (fact) recognition that the lock-up shock provides no problem in terms of a bodily sensation in a case where the lock-up capacity during the no-load state is smaller than a certain value although, as the lock-up capacity during no-load state becomes larger, the lock-up shock becomes more remarkable, eliminate the problem on the worsening of the fuel consumption and eliminate the problem on the loss of the direct sensation due to the racing of the engine by continuing the time series augmentation control of the lock-up capacity to advance the lock up in the case of the lock-up capacity during the no-load state in which the lock-up shock provides no problem in terms of the bodily sensation.

According to one aspect of the present invention, there is provided a lock-up capacity control apparatus for a torque converter, the torque converter enabling a relative revolution between input and output elements of the torque converter to be limited and constituting a vehicular power train with a combination of an engine and an automatic transmission, the lock-up capacity control apparatus comprising: a controller configured to cause the torque converter to have a converter state in which the relative revolution between the input and output elements of the torque converter is free of limitation in a case where a lock-up capacity (L/Uprso) during a no-load state when the engine is switched into the no-load state is equal to or larger than a shock determining lock-up capacity ($\alpha$), during an acceleration slip lock up in which the lock-up capacity of the torque converter is augmented by means of a time series control which accords with a load state of the engine, and to cause the torque converter to be oriented toward a lock-up state in which the relative revolution between the input and output elements of the torque converter is zeroed by continuing an augmentation of the lock-up capacity by means of the time series control in a case where the lock-up capacity during the no-load state is smaller than the shock determining lock-up capacity ($\alpha$) during the acceleration slip lock up.

According to another aspect of the present invention, there is provided a lock-up capacity control method for a torque converter, the torque converter enabling a relative revolution between input and output elements of the torque converter to be limited and constituting a vehicular power train with a combination of an engine and an automatic transmission, the lock-up capacity control method comprising: causing the torque converter to have a converter state in which the relative revolution between the input and output elements of the torque converter is free of limitation in a case where a lock-up capacity (L/Uprso) during a no-load state when the engine is switched into the no-load state is equal to or larger than a shock determining lock-up capacity ($\alpha$), during an acceleration slip lock up in which the lock-up capacity of the torque converter is augmented by means of a time series control which accords with a load state of the engine, and causing the torque converter to be oriented toward a lock-up state in which the relative revolution between the input and output elements of the torque converter is zeroed by continuing an augmentation of the lock-up capacity by means of the time series control in a case where the lock-up capacity during the no-load state is smaller than the shock determining lock-up capacity ($\alpha$) during the acceleration slip lock up.

This summary of the invention does not necessarily describe all necessary features so that the invention may also be a sub-combination of these described features.

BRIEF DESCRIPTION OF THE DRAWINGS

FIGS. 6A1, 6A2, 6A3, 6B1, 6B2, 6B3, 6C1, 6C2, 6C3, 6D1, 6D2, and 6D3 are integrally operational timing charts when the lock-up capacity is determined according to the control program shown in FIG. 2, FIGS. 6A1 through 6A3 integrally showing the operational timing chart when the lock-up capacity during a no-load state is small and a lock-up shock during a release of an accelerator pedal does not occur, FIGS. 6B1 through 6B3 integrally showing the operational timing chart when the lock-up capacity during the no-load state is large, a torque converter slip quantity is large, and the lock-up shock during the release of the accelerator pedal occurs, FIGS. 6C1 through 6C3 integrally showing the operational timing chart when the lock-up capacity during the no-load state is large, the torque converter slip quantity is small, and the lock-up shock during the release of accelerator pedal does not occur, and FIGS. 6D1 through 6D3 integrally showing the operational timing chart when the accelerator pedal is continued to be depressed until the lock up due to a re-acceleration is completed and a throttle valve is continuously opened so that the lock-up shock during the release of the accelerator pedal does not occur.

DETAILED DESCRIPTION OF THE PREFERRED EMBODIMENT

Reference will hereinafter be made to the drawings in order to facilitate a better understanding of the present invention.

Figure 1:
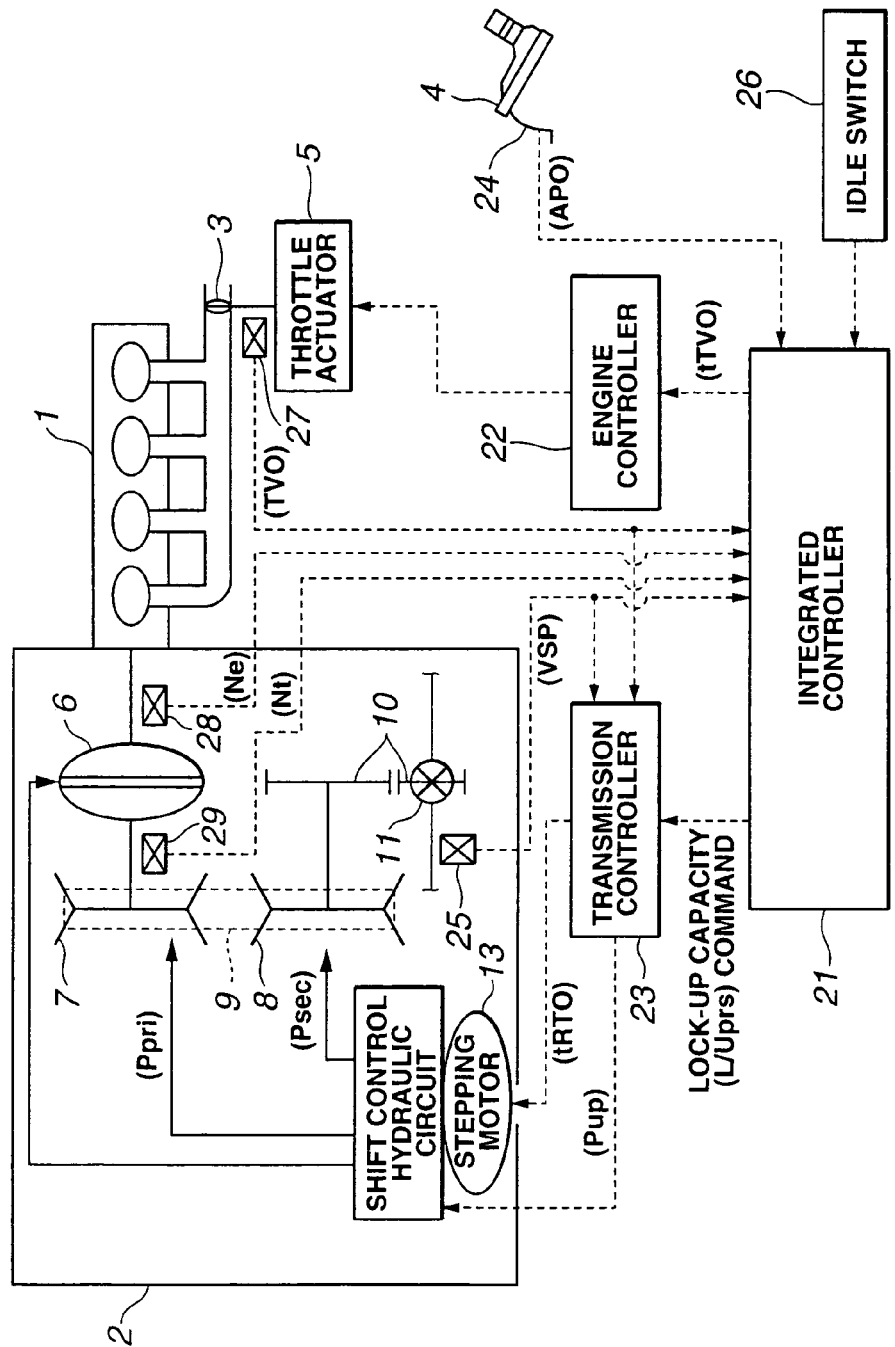
FIG. 1 is a system configuration view representing a vehicular power train and its control system to which a lock-up capacity control apparatus in a preferred embodiment according to the present invention is applicable.

FIG. 1 shows a vehicular power train and its control system to which a preferred embodiment of a lock-up capacity control apparatus according to the present invention is applicable. This power train is constituted by an engine 1 and an automatic transmission constituted by a continuously variable transmission 2. Engine 1 is a gasoline engine. A throttle valve 3 of engine 1 is not mechanically connected to an accelerator pedal 4 but is separated from accelerator pedal 4. A throttle actuator 5 electronically controls an opening angle of throttle valve 3.

A manipulated variable of throttle actuator 5 is controlled by means of an engine controller 22 which responds to a command on a target throttle opening angle tTVO determined by an integrated controller 21 according to an operation (depression) of accelerator pedal 4. Thus, an actual opening angle of throttle valve is made coincident with target throttle opening angle tTVO and an output of engine 1 is controlled to be a value in accordance with the operation of accelerator pedal 4. It is noted that engine controller 22 carries out the opening angle control of throttle valve 3 via throttle actuator 5 and carries out a fuel injection quantity control, a fuel supply cut-off control, an ignition timing control, and so forth required to drive engine 1.

Continuously variable transmission 2 is a well known V-belt type continuously variable transmission and includes a primary pulley 7 drivingly coupled to an output shaft of engine 1 via a lock-up (type) torque converter 6, a secondary pulley 8 aligned with primary pulley 7, and a V belt 9 bridged between both pulleys 7, 8. Differential gear unit 11 is drivingly coupled to secondary pulley 8 via a final drive gear couple 10. These components rotatably drive road wheels (not shown) of the vehicle. A shift operation of continuously variable transmission 2 is carried out as follows. One movable flange is relatively approached to another stationary flange, from among the flanges forming the respective V groove of primary pulley 7 and secondary pulley 8, to narrow a V groove width and, on the contrary, is relatively spaced apart from each other to widen the V groove width. Stroke positions of both movable flanges are determined according to a ratio between primary pulley pressure Ppri and secondary pulley pressure Psec from a shift control hydraulic circuit 12.

Shift control hydraulic circuit 12 includes a stepping motor 13 as a shift actuator. Continuously variable transmission 2 is shifted at an unlimited stage (continuously varies the shift ratio) so that an actual shift ratio (an actual speed ratio) is made coincident with a target shift ratio (a target speed ratio) tRTO by driving stepping motor 13 to a step position corresponding to target shift ratio tRTO by means of transmission controller 23. Transmission controller 23 serves to output a lock-up engagement pressure signal (Pup) corresponding to a lock-up capacity L/Uprs command determined by integrated controller 21 to shift control hydraulic circuit 12 as will be described later. Shift control hydraulic circuit 12 serves to control a lock-up engagement pressure supplied to torque converter 6 to a value corresponding to lock-up engagement pressure signal (Pup), serves to cause torque converter 6 to have a slip control state in which the relative revolution (slip) between the input and output elements of torque converter 6 is limited, serves to cause torque converter 6 to have a lock-up state in which the input element of torque converter 6 is directly coupled to the output element thereof, and serves to cause torque converter 6 to have a converter state in which the slip limitation state is released (free of limitation). Transmission controller 23, to derive target shift ratio tRTO, derives a target input revolution speed (a target primary revolution speed) on the basis of a predetermined gear shift line from throttle opening angle TVO and vehicle speed VSP and divides this target input revolution speed by a transmission input revolution speed (can be derived from vehicle speed VSP).

Integrated controller 21 inputs a signal from an accelerator opening angle sensor 24 to detect a depression quantity (accelerator opening angle) APO of an accelerator pedal 4, a signal from vehicle speed sensor 25 to detect vehicle speed VSP from revolution speeds of the road wheels, a signal from an idle switch 26 which is turned on when accelerator pedal 4 is released (accelerator opening angle APO=0), a signal from a throttle opening angle sensor 27 to detect throttle opening TVO of throttle valve 3, a signal from an engine speed sensor 28 to detect an engine speed Ne (=torque converter input revolution speed), and a signal from a turbine speed sensor 29 to detect a torque converter output speed (turbine revolution speed) Nt, respectively. It is noted that the vehicle speed VSP signal from vehicle speed sensor 25 and the throttle opening angle TVO signal from throttle opening angle sensor 27 are supplied to transmission controller 23 and transmission controller 23 uses these signals to derive target shift ratio tRTO.

A calculation processing when integrated controller 21 derives lock-up capacity (L/Uprs) command of transmission controller 23 will be described below. When this calculation processing is carried out, integrated controller 21 executes a control program shown in FIG. 2.

At a step S1, integrated controller 21 determines whether the present time is during a learning control of a coast lock-up (L/U) capacity. The learning control of the coast lock-up capacity is such that integrated controller 21, upon receipt of an ON signal of idle switch 26, viz., during a coast running with accelerator pedal 4 released, learns that lock-up capacity L/Uprs becomes a smallest lock-up capacity in a range in which torque converter 6 does not slip (the smallest lock-up capacity immediately before torque converter 6 starts to slip). Thus, even during drive wheel's lock due to an abrupt braking, a lock-up release (transfer to a converter state) of torque converter 6 can quickly be completed to prevent an engine stalling.

If, at step S1, integrated controller 21 determines that the present time is not during the learning control of the coast lock-up (L/U) capacity, the routine is returned to an original position and waits. If integrated controller 21 determines, at step S1, that the present time is during the learning control of coast L/U capacity, the routine goes to a step S2. At step S2, integrated controller 21 checks to see whether idle switch 26 is turned off, namely checks to see whether a re-acceleration operation due to the depression of accelerator pedal 4 is carried out during the learning control of the coast L/U capacity. Since, until this re-acceleration operation is present, it is not necessary to perform the lock-up capacity L/Uprs control according to the present invention, the routine is returned to the original position and waits. If the re-acceleration operation is carried out (Yes) at step S2, the routine goes to a step S3. At step S3, integrated controller 21 augments (increases) lock-up capacity L/Uprs at a ramp gradient (time gradient) shown in FIG. 3 according to throttle opening angle TVO (representing a transmission torque of torque converter 6) by means of a time series control. The ramp gradient (time gradient) during the re-acceleration of lock-up capacity L/Uprs, in a case of any throttle valve opening angle TVO (transmission torque), is initially a small constant lock-up capacity to prevent a generation of fluctuations (so-called chattering shocks) and, thereafter, an increased (augmented) lock-up capacity at a gradient steeper as throttle opening angle TVO (transmission torque) during the re-acceleration becomes larger (wider). The reason that, as throttle opening angle TVO (transmission torque) during the re-acceleration becomes larger, the ramp gradient (time gradient) during the re-acceleration of lock-up capacity L/Uprs becomes steeper is that a slow augmentation (increase) of the lock-up capacity when throttle opening angle TVO (transmission torque) during the re-acceleration is large causes an insufficient lock-up capacity with respect to the torque during a transient state so that the slip occurs in the torque converter and a problem of a wear of a lock-up clutch facing occurs.

At the next step S4, integrated controller 21 determines whether the lock up should be completed depending upon whether lock-up capacity L/Uprs has reached to a value at which the lock up of torque converter 6 should be completed. If integrated controller 21 determines that the lock up should be completed, the routine goes to a step S5. At step S5, integrated controller 21 outputs sequentially augmenting lock-up capacity L/Uprs such that the continuation of the control in the same way as step S3 completes the lock up to transmission controller 23 shown in FIG. 1 and finally finishes the lock up. If integrated controller 21 determines that lock-up capacity L/Uprs has not reached to the value at which the lock up of torque converter 6 should be completed (No), the routine goes to a step S6. Then, the control of the lock-up capacity which is an aim of the present invention will be carried out as follows.

At step S6, integrated controller 21 determines whether idle switch 26 is turned on to determine whether the release of accelerator pedal 4 is present for the engine to be switched into a no-load state before the lock up for the re-acceleration is completed. If this release of accelerator pedal 4 is not present (No) at step S6, the routine is returned to step S3 at which the operation such that lock-up capacity L/Uprs is augmented by means of the time series control in accordance with throttle opening TVO (transmission torque) during the re-acceleration is continued until the completion of the lock up since it is not necessary to perform the lock-up capacity control which is the aim of the present invention.

Figure 4:
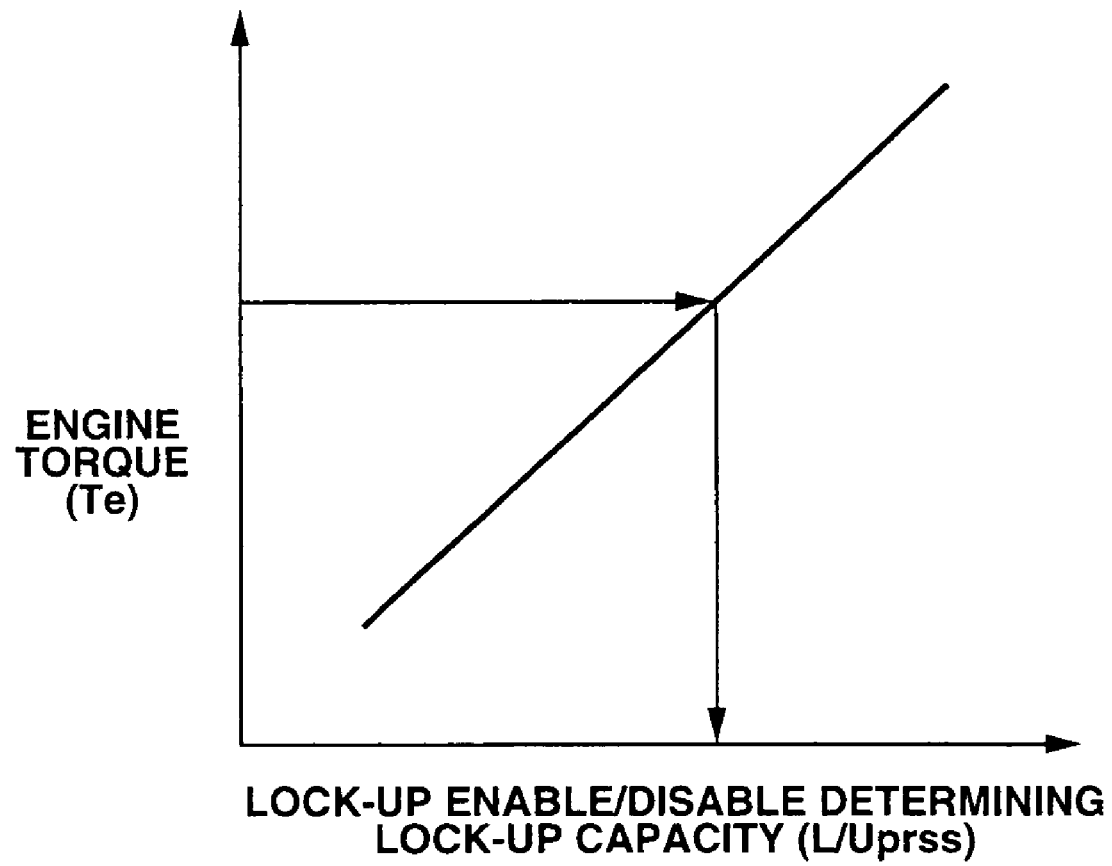
FIG. 4 is a variation characteristic graph representing a lock-up enable/disable determining lock-up capacity.

If, at step S6, integrated controller 21 determines that idle switch 26 is turned on (Yes), namely determines that the release of accelerator pedal 4 for the engine to be switched into the no-load state is present before the lock up for the re-acceleration is completed, the routine goes to a step S7. At step S7, integrated controller 21 stores lock-up capacity L/Uprs during the release of accelerator pedal 4 (during the engine no-load state) as a lock-up capacity L/Uprs during the no-load state (L/Uprso←L/Uprs). At the next step S8, integrated controller 21 determines whether lock-up capacity L/Uprso during no-load state is equal to or larger than a lock-up enable/disable determination lock-up capacity L/Uprss to determine whether lock-up capacity L/Uprso during no-load state is a lock-up enable (or disable) lock-up capacity. Lock-up enable/disable determining lock-up capacity L/Uprss is derived through a search based on a predetermined map as shown in FIG. 4 from an engine torque Te (a transmission torque of torque converter 6) during a switch of engine 1 into the no-load state. As engine torque Te (transmission torque of torque converter 6) becomes larger, lock-up enable/disable determining lock-up capacity L/Uprss becomes larger.

If, at step S8, integrated controller 21 determines that lock-up capacity L/Uprso during no-load state is equal to or larger than lock-up enable/disable determining lock-up capacity L/Uprss (the lock-up enable lock-up capacity during no-load state) (Yes), the routine goes to a step S9. At step S9, integrated controller 21 determines whether lock-up capacity L/Uprso during no-load state is equal to or larger than a predetermined allowable lock-up limit value α shown in FIG. 5 to determine whether a lock-up shock during the release of accelerator pedal 4 occurs.

Allowable lock-up capacity limit value α is determined as follows: first, with each of lock-up capacity L/Uprso values during the no-load state arranged in a lateral axis of FIG. 5, a vehicle acceleration G is derived and plotted which is developed when the lock-up capacity is augmented by means of the time series control at the gradient described with reference to FIG. 3 from lock-up capacity L/Uprso during the no-load state and vehicle acceleration G is determined for each of lock-up capacity L/Uprso values. Then, on the basis of this relationship between lock-up capacity L/Uprso during the no-load state and vehicle acceleration G, lock-up capacity (L/Uprso) during the no-load state corresponding to an allowable acceleration limit value G0 up to which vehicle acceleration G provides no problem as a shock is determined as allowable lock-up capacity limit value α used for the lock-up shock determination during the release of accelerator pedal 4. In the case of lock-up capacity during the no-load state L/Uprso at which the acceleration equal to or larger than allowable acceleration limit value G0 is developed (L/Uprso≧α), the problematic lock-up shock during the release of accelerator pedal 4 occurs. In the case of lock-up capacity L/Uprso during the no-load state at which the acceleration equal to or larger than allowable acceleration limit value G0 is not developed (L/Uprso<α), the problematic large lock-up shock during the release of accelerator pedal 4 does not occur.

If integrated controller 21 determines that lock-up capacity during the no-load state L/Uprso is not equal to or larger than allowable lock-up capacity limit value α (No), namely, in a case where the lock-up shock during the release of accelerator pedal 4 does not occur even by the continuous augmentation (increase) of lock-up capacity L/Uprs, the routine goes to step S5 at which sequentially augmenting lock-up capacity L/Uprs such that the continuation of the control in the same way as step S3 completes the lock up is outputted to transmission controller 23 shown in FIG. 1 and finally the lock up is finished.

If, at step S9, integrated controller 21 determines that lock-up capacity L/Uprso during the no-load state is equal to or larger than allowable lock-up capacity limit value α (Yes), namely, in a case where the continuous augmentation (increase) of lock-up capacity L/Uprs causes the lock-up shock during the release of accelerator pedal 4 to occur, the routine goes to a step S10. At step S10, integrated controller 21 subtracts turbine revolution speed Nt from engine speed Ne to derive a slip quantity ΔN (=Ne−Nt) and determines whether this slip quantity ΔN is equal to or larger than a shock determining slip revolution (quantity) β to check to see whether torque converter 6 has a large slip revolution such that the continuous augmentation of lock-up capacity L/Uprs causes the lock-up shock during the release of accelerator pedal 4 to occur.

In a case where integrated controller 21 determines, at step S10, that slip quantity ΔN of torque converter 6 is smaller than shock determining slip revolution β even if integrated controller 21 determines, at step S9, that lock-up capacity L/Uprso during the no-load state is equal to or larger than allowable lock-up capacity limit value α, torque converter 6 is not slipped to a degree such that, if lock-up capacity L/Uprs is continuously augmented, the lock-up shock during the release of accelerator pedal 4 occurs. Hence, the routine goes from step S10 to step S5 at which sequentially augmenting lock-up capacity L/Uprs such that the continuation of the control in the same way as step S3 completes the lock up is outputted to transmission controller 23 shown in FIG. 1 and finally the lock up is finished.

However, if integrated controller 21 determines, at step S9, that lock-up capacity L/Uprso during the no-load state is equal to or larger than allowable lock-up capacity limit value α and determines, at step S10, that slip quantity ΔN of torque converter 6 is equal to or larger than shock determining slip revolution β, the lock-up shock during the release of accelerator pedal is positively developed if lock-up capacity L/Uprs is continuously augmented. Hence, the routine goes to a step S11. At step S11, integrated controller 21 sequentially decreases lock-up capacity L/Uprs through a lock-up release control. This sequentially decreasing lock-up capacity L/Uprs is outputted to transmission controller 23 shown in FIG. 1 to cause torque converter 6 to have the converter state due to a lock-up release.

It is noted that if, at step S8, integrated controller 21 determines that lock-up capacity L/Uprso during the no-load state is smaller than lock-up enable/disable determining lock-up capacity L/Uprss, namely, determines that lock-up capacity L/Uprso during the no-load state is a lock-up disable lock-up capacity during the no-load state, even if determination results of steps S9 and S10 select step S5, the process at step S5 cannot substantially be executed and the routine goes to step S11 at which torque converter 6 is caused to have the converter state due to the lock-up release.

According to the lock-up capacity control apparatus for the torque converter in the preferred embodiment, the following action and advantages can be obtained. FIGS. 6A1, 6A2, and 6A3 integrally show an operational timing chart in which the coast lock-up capacity control (step S1) corresponding to the coast running with throttle opening angle TVO=0 is carried out up to an instantaneous time t1, the augmentation of lock-up capacity L/Uprs (step S3) according to the time series control described with reference to FIG. 3 corresponding to the increase (re-acceleration) of throttle opening angle TVO due to the depression of accelerator pedal 4 is started at instantaneous time t1, the slip indicated as a separation of engine speed Ne from turbine revolution speed Nt temporarily occurs in torque converter 6, and throttle opening angle TVO is zeroed due to the release of accelerator pedal 4 at an instantaneous time t2.

In the case of FIGS. 6A1, 6A2, and 6A3, since lock-up capacity L/Uprso during the no-load state at instantaneous time t2 at which throttle opening angle TVO is zeroed due to the release of accelerator pedal 4 is smaller than shock determining allowable lock-up capacity limit value α (step S9), on the basis of a determination that, even if the augmentation of lock-up capacity L/Uprs is continued until instantaneous time t2, the lock-up shock during the release of accelerator pedal 4 does not occur, the augmentation control of lock-up capacity L/Uprs is continued (step S5) and the lock up is completed at an instantaneous time t3. Thus, no lock-up release is carried out at instantaneous time t2 in spite of the fact that the lock-up shock during the release of accelerator pedal 4 does not occur. Such a problem that engine speed Ne is abruptly reduced due to the unnecessary lock-up release as denoted by a broken line of FIG. 6A3, a fuel supply cut-off is halted (a fuel recovery), and a fuel consumption becomes worse can be eliminated.

Figure 3:
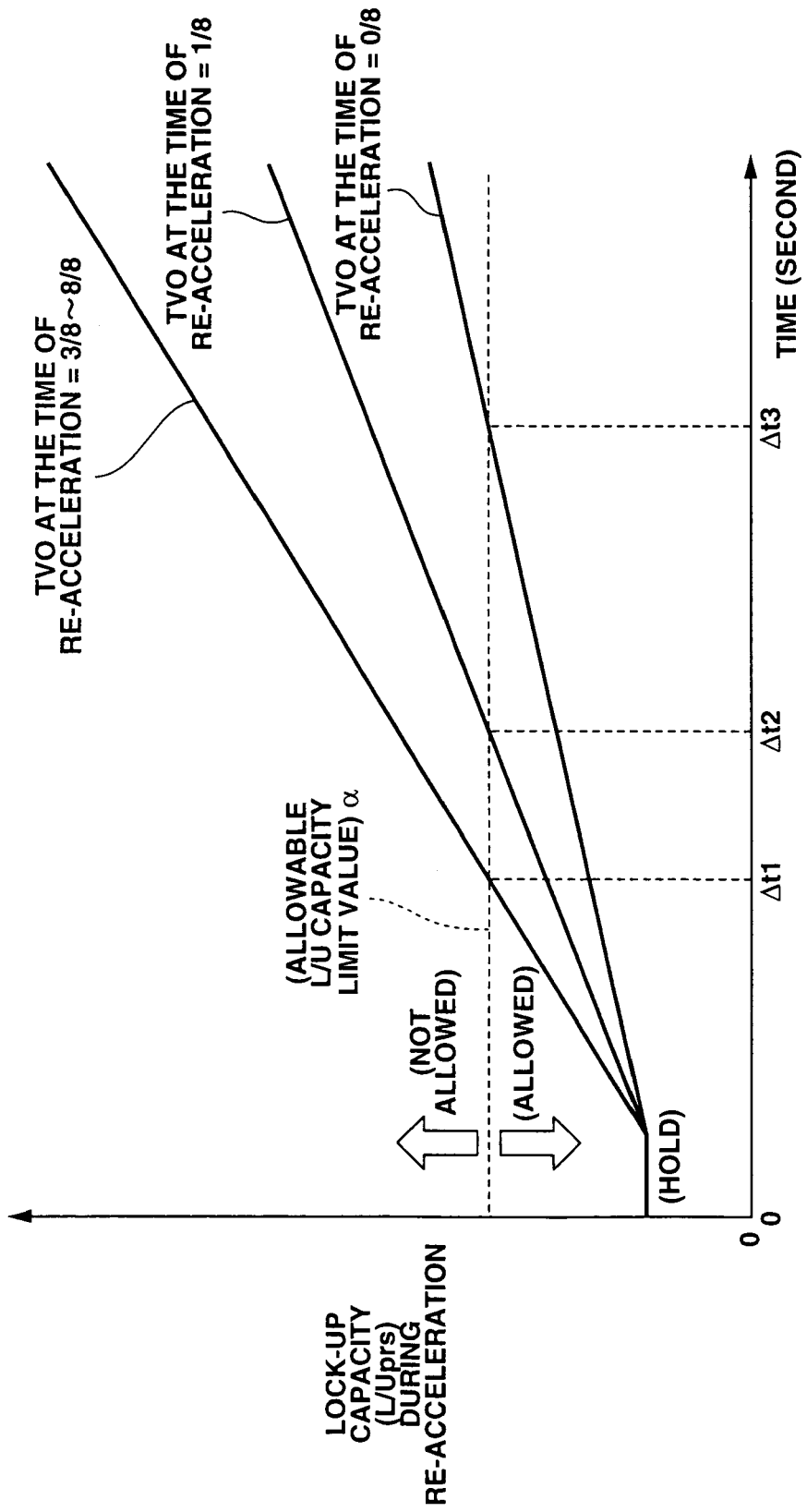
FIG. 3 is a diagram representing time series augmentation control characteristics of a lock-up capacity when a control is transferred from a coast lock-up capacity control to a lock-up capacity control at a time of a re-acceleration.

In addition, since, as described above, the unnecessary lock-up release is not carried out at instantaneous time t2, even if the twice acceleration due to the depression of accelerator pedal 4 after instantaneous time t2 at which engine 1 is switched into the no-load state (throttle opening angle TVO=0) although not shown in FIGS. 6A1 through 6A3, the racing of engine 1 does not occur and a problem on the loss of the direct sensation due to the acceleration response delay can be eliminated.

FIGS. 6B1, 6B2, and 6B3 integrally show an operational flowchart in which the coast lock-up capacity control (step S1) corresponding to the coast running with throttle opening angle TVO=0 is carried out up to instantaneous time t1, the augmentation of lock-up capacity L/Uprs (step S3) according to the time series control described with reference to FIG. 3 corresponding to the increase (re-acceleration) of throttle opening angle TVO due to the depression of accelerator pedal 43 (re-acceleration) of throttle opening angle TVO due to the depression of accelerator pedal 4 is started at instantaneous time t1, the slip indicated as the separation of engine speed Ne from turbine revolution speed Nt temporarily occurs in torque converter 6, and throttle opening angle TVO is zeroed due to the release of accelerator pedal 4.

In the case of FIGS. 6B1, 6B2, and 6B3, since lock-up capacity L/Uprso during the no-load state at instantaneous time t2 at which throttle opening angle TVO is zeroed due to the release of accelerator pedal 4 is in excess of shock determining allowable lock-up capacity limit value α (step S9) and slip capacity ΔN of torque converter 6 is equal to or larger than shock determining slip revolution β (step S10), the augmentation control of lock-up capacity L/Uprs is stopped and lock-up capacity L/Uprs is decreased (step S11) on the basis of the determination that the lock-up shock during the release of accelerator pedal 4 occurs if the augmentation of lock-up capacity L/Uprs is continued up to instantaneous time t2. At instantaneous time t3, torque converter 6 is caused to have the converter state due to the completion of the lock-up release.

Thus, under a situation in which the lock-up shock during the release of accelerator pedal 4 occurs if the augmentation of lock-up capacity L/Uprs is continued even after instantaneous time t2, the lock-up shock during the release of accelerator pedal 4 can positively be relieved or eliminated due to the converter state of torque converter 6.

FIGS. 6C1, 6C2, and 6C3 integrally show an operational timing chart in which the coast lock-up capacity control (step S1) corresponding to the coast running with throttle opening angle TVO=0 is carried out up to instantaneous time t1, the augmentation of lock-up capacity L/Uprs (step S3) according to the time series control described with reference to FIG. 3 corresponding to the increase (re-acceleration) of throttle opening angle TVO due to the depression of accelerator pedal 4 is started at instantaneous time t1, the slip indicated as the separation of engine speed Ne from turbine revolution speed Nt temporarily occurs in torque converter 6, and throttle opening angle TVO is zeroed due to the release of accelerator pedal 4.

In the case of FIGS. 6C1, 6C2, and 6C3, since lock-up capacity L/Uprso during the no-load state at instantaneous time t2 at which throttle opening angle TVO is zeroed due to the release of accelerator pedal 4 is in excess of shock determining allowable lock-up capacity limit value α (step S9) but slip quantity ΔN of torque converter 6 is smaller than shock determining slip revolution β (step S10) (ΔN<β), the augmentation control of lock-up capacity L/Uprs is continued (step S5) and the lock up is completed at instantaneous time t3 on the basis of the determination that the lock-up shock during the release of accelerator pedal 4 does not occur even if the augmentation of lock-up capacity L/Uprs is continued up to instantaneous time t2. Thus, no lock-up release is carried out at instantaneous time t2 in spite of the fact that the lock-up shock during the release of accelerator pedal 4 does not occur. Such a problem that engine speed Ne is abruptly reduced due to the unnecessary lock-up release, the fuel supply cut-off is halted (the fuel recovery), and the fuel consumption becomes worse can be eliminated. In addition, since, as described above, the unnecessary lock-up release is not carried out at instantaneous time t2, even if the twice acceleration due to the depression of accelerator pedal 4 after instantaneous time t2 at which engine 1 is switched into the no-load state (throttle opening angle TVO=0) although not shown in FIGS. 6C1 through 6C3, the racing of engine 1 does not occur and the problem on the loss of the direct sensation due to the acceleration response delay can be eliminated.

FIGS. 6D1, 6D2, and 6D3 integrally show an operational timing chart in which the coast lock-up capacity control (step S1) corresponding to the coast running with throttle opening angle TVO=0 is carried out up to instantaneous time t1, the augmentation of lock-up capacity L/Uprs (step S3) according to the time series control described with reference to FIG. 3 corresponding to the increase (re-acceleration) of throttle opening angle TVO due to the depression of accelerator pedal 4 is started at instantaneous time t1, the slip indicated as the separation of engine speed Ne from turbine revolution speed Nt temporarily occurs in torque converter 6, and, thereafter, throttle opening angle TVO is held as TVO>0 due to no release of accelerator pedal 4.

In the case of FIGS. 6D1, 6D2, and 6D3, after instantaneous time t1, the accelerator pedal is continued to be depressed and the problem of the lock-up shock during the release of accelerator pedal 4 does not occur. Hence, step S4 of the routine shown in FIG. 2 continues to select step S5, lock-up capacity L/Uprs is continuously augmented according to the time series control described with reference to FIG. 8 after instantaneous time t1, and the lock up is completed at instantaneous time t3.

Thus, no lock-up release is carried out in spite of the fact that the lock-up shock during the release of accelerator pedal 4 does not occur. Such a problem that engine speed Ne is abruptly reduced due to the unnecessary lock-up release, the fuel supply cut-off is halted (the fuel recovery), and the fuel consumption becomes worse can be eliminated.

In a case where, at an instantaneous time t4 after instantaneous time t3 at which the lock up is completed, throttle opening angle TVO is zeroed as denoted by the broken line in FIG. 6D1, engine speed Ne and turbine revolution speed Nt are equally reduced as denoted by the broken lines in FIG. 6D3 in response to zeroed throttle opening angle TVO due to the lock-up state of torque converter 6.

In the preferred embodiment, only if lock-up capacity L/Uprso during the no-load state is equal to or larger than lock-up enable/disable determining lock-up capacity L/Uprss (lock-up enable lock-up capacity) at step S8 shown in FIG. 8, steps S9 and S10 select step S5 to continue the augmentation control (the advance of the lock up) of lock-up capacity L/Uprs. Hence, such an erroneous control that the augmentation control of lock-up capacity L/Uprs (the advance of lock up) in spite of the fact that the advance of the lock up is continued can be avoided. In addition, the lock-up enable/disable determining lock-up capacity L/Uprss is, as shown in FIG. 4, set to a larger value as engine torque Te (the transmission torque of torque converter 6) at the time of the switch of engine 1 into the no-load state becomes larger. Hence, the above-described action and advantages can be achieved under every engine torque Te (the transmission torque) during the no-load state.

Figure 5:
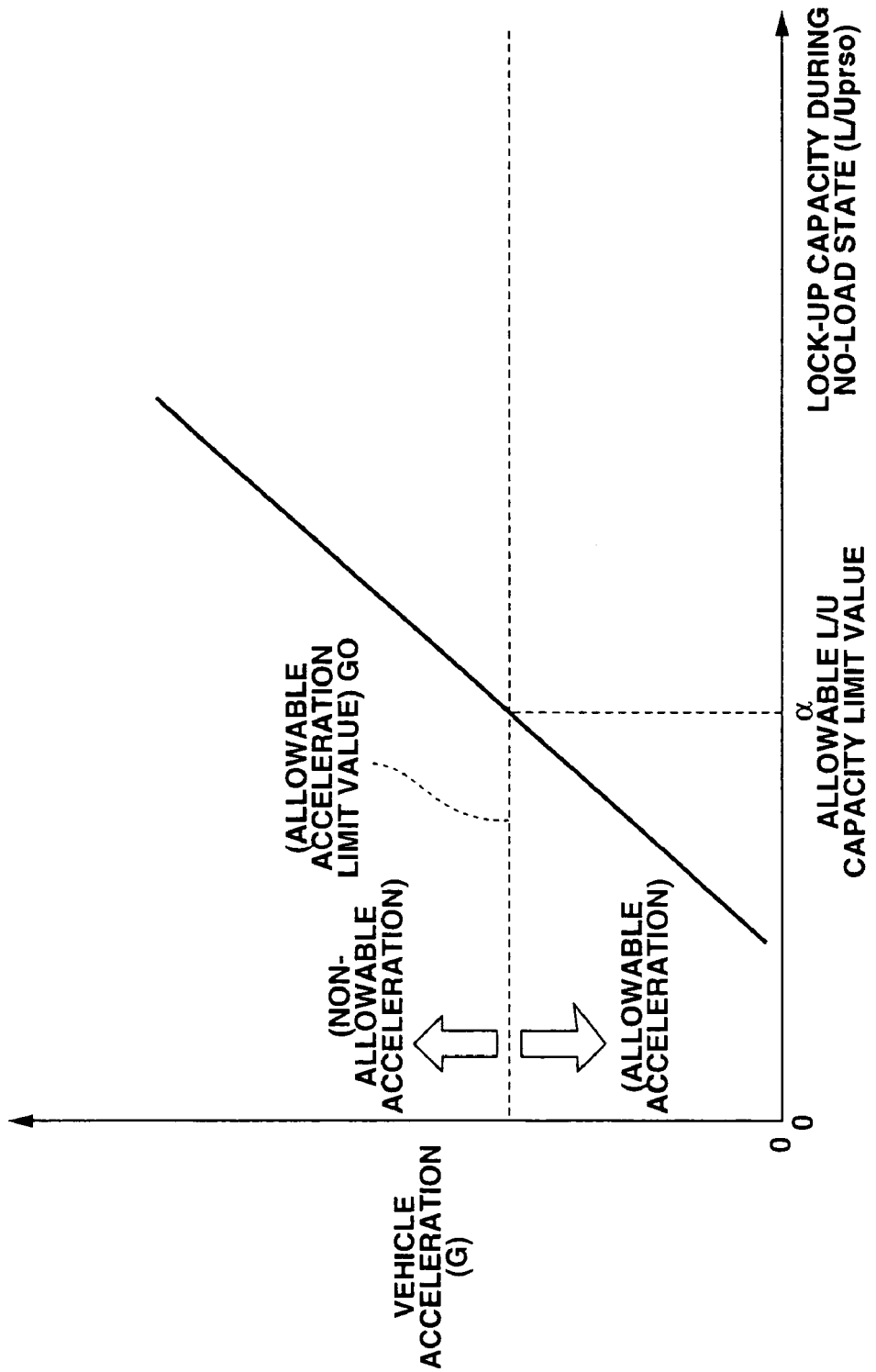
FIG. 5 is a diagram for explaining a determining method of an allowable lock-up capacity limit value corresponding to an allowable acceleration limit value above which a problem of a lock-up shock during a release of an accelerator pedal is provided.

Allowable lock-up capacity limit value α shown in FIG. 5 can be transcribed to FIG. 3. Therefore, integrated controller 21 can determine whether lock-up capacity L/Uprs has reached to allowable lock-up capacity limit value α depending upon whether a passage time from a time at which the augmentation of lock-up capacity L/Uprs along with the re-acceleration is started (instantaneous time t1 shown in FIGS. 6A1 through 6D3) indicates one of Δt1 (when throttle opening angle TVO at the time of the re-acceleration is from 3/8 to 8/8), Δt2 (when throttle opening angle TVO at the time of the re-acceleration is 1/8), and Δt3 (when throttle opening angle TVO at the time of the re-acceleration is 0/8).

Figure 2:
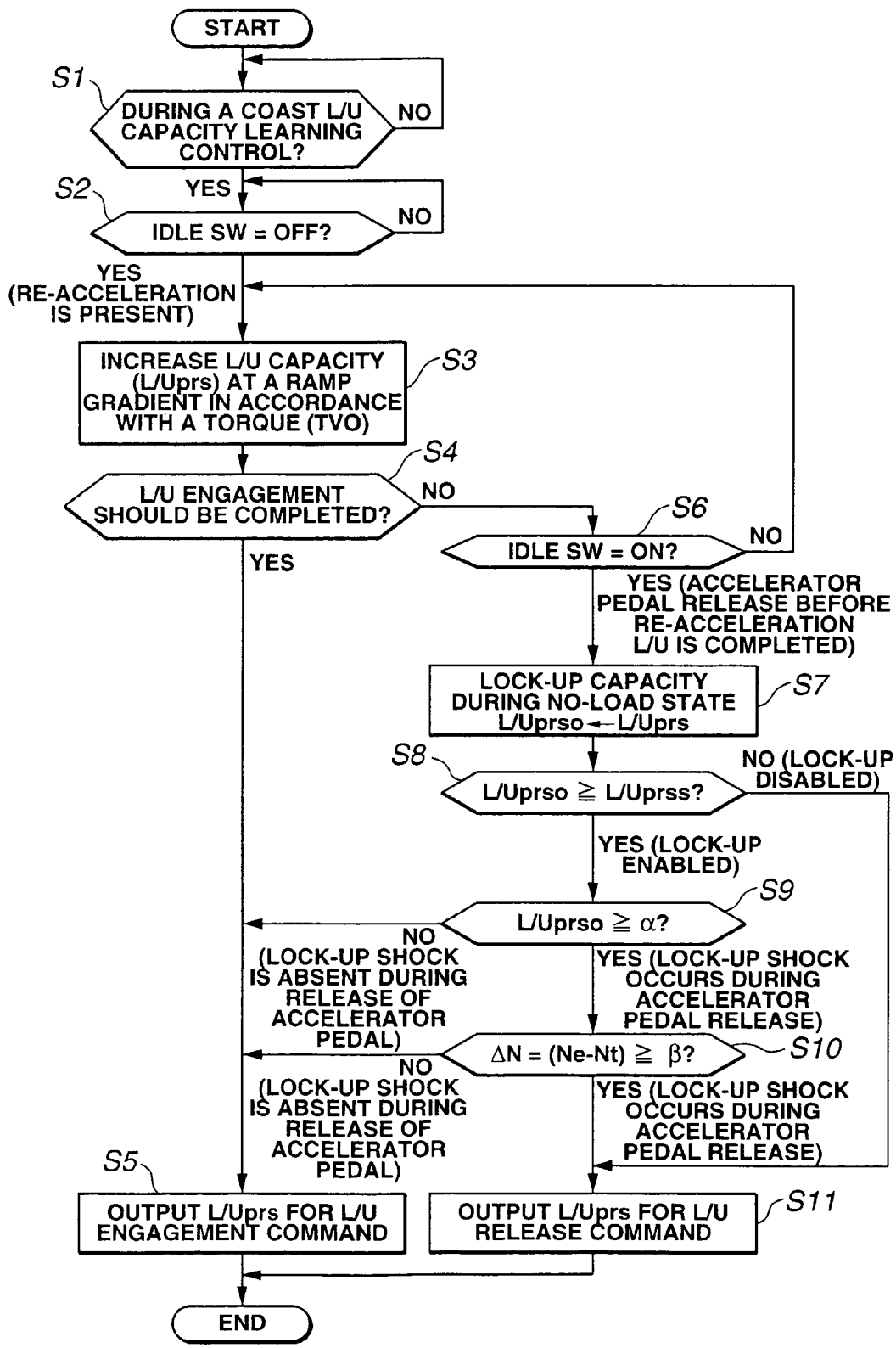
FIG. 2 is an operational flowchart of a lock-up capacity control program executed by an integrated controller in the vehicular power train shown in FIG. 1.

When the above-described method is used, in place of a direct check of lock-up capacity L/Uprso during the no-load state against allowable lock-up capacity limit value α at step S9 shown in FIG. 2, the passage time from the time (instantaneous time t1 in FIGS. 6A1 through 6D3) at which the augmentation of lock-up capacity L/Uprs along with the re-acceleration is started is measured with a timer TM. Then, depending upon whether the measured value of timer TM at instantaneous time t2 at which accelerator pedal 4 is released indicates equal to or longer than Δt1 (when throttle opening angle TVO at the time of the re-acceleration is from 3/8 to 8/8), indicates equal to or longer than Δt2 (when throttle opening angle TVO at the time of the re-acceleration is 1/8), or indicates equal to or longer than Δt3 (when throttle opening angle TVO at the time of the re-acceleration is 0/8), integrated controller 21 can determine whether lock-up capacity L/Uprso during the no-load state is equal to or larger than allowable lock-up capacity limit value α.

The entire contents of a Japanese Patent Application No. 2004-150307 (filed in Japan on May 20, 2004) are herein incorporated by reference. The scope of the invention is defined with reference to the following claims.

What is claimed is:

1. A lock-up capacity control apparatus for a torque converter, the torque converter enabling a relative revolution between input and output elements of the torque converter to be limited and constituting a vehicular power train with a combination of an engine and an automatic transmission, the lock-up capacity control apparatus comprising: a controller configured to cause the torque converter to have a converter state in which the relative revolution between the input and output elements of the torque converter is free of limitation in a case where a lock-up capacity (L/Uprso) during a no-load state when the engine is switched into the no-load state is equal to or larger than a shock determining lock-up capacity (α), during an acceleration slip lock up in which the lock-up capacity of the torque converter is augmented by means of a time series control which accords with a load state of the engine, and to cause the torque converter to be oriented toward a lock-up state in which the relative revolution between the input and output elements of the torque converter is zeroed by continuing an augmentation of the lock-up capacity by means of the time series control in a case where the lock-up capacity during the no-load state is smaller than the shock determining lock-up capacity (α) during the acceleration slip lock up.

2. A lock-up capacity control apparatus for a torque converter as claimed in claim 1, wherein the controller is configured to cause the torque converter to have the converter state when the lock-up capacity (L/Uprso) during the no-load state is a lock-up disable capacity smaller than a lock-up enable/disable determining lock-up capacity (L/Uprss) without a determination of whether the lock-up capacity (L/Uprso) during the no-load state is equal to or larger than the shock determining lock-up capacity (α).

3. A lock-up capacity control apparatus for a torque converter as claimed in claim 2, wherein the controller is configured to set the lock-up enable/disable determining lock-up capacity (L/Uprss) to become larger as a transmission torque of the torque converter during the no-load state in which the engine is switched into the no-load state becomes larger in accordance with the transmission torque of the torque converter during the no-load state.

4. A lock-up capacity control apparatus for a torque converter as claimed in claim 1, wherein the controller is configured to previously derive a vehicle acceleration (G) developed when the lock-up capacity is augmented by means of the time series control from the lock-up capacity (L/Uprso) during the no-load state for each of the lock-up capacity during the no-load state values and to define the lock-up capacity during the no-load state corresponding to an allowable acceleration limit value (G0) up to which the vehicle acceleration provides no problem of a shock as the shock determining lock-up capacity ($\alpha$).

5. A lock-up capacity control apparatus for a torque converter as claimed in claim 1, wherein, when the relative revolution between the input and output elements of the torque converter during the no-load state is smaller than a shock determining slip revolution ($\beta$), the controller is configured to continue an advance of the lock up to cause the torque converter to be oriented toward the lock-up state even if the lock-up capacity during the no-load state is equal to or larger than the shock determining lock-up capacity ($\alpha$) during the acceleration slip lock up.

6. A lock-up capacity control apparatus for a torque converter as claimed in claim 1, wherein the controller is configured to determine whether a release of an accelerator pedal in order for the engine to be switched into the no-load state occurs during the acceleration slip lock up before a completion of the lock up for a re-acceleration and to store the lock-up capacity (L/Uprs) during the release of the accelerator pedal as the lock-up capacity (L/Uprso) during the no-load state when determining that the release of the accelerator pedal occurs.

7. A lock-up capacity control apparatus for a torque converter as claimed in claim 6, wherein the controller is configured to determine whether the lock-up capacity (L/Uprso) during the no-load state is equal to or larger than a lock-up enable/disable determining lock-up capacity (L/Uprss) to determine whether the lock-up capacity (L/Uprso) during the no-load state is a lock-up enable lock-up capacity and to determine whether the lock-up capacity (L/Uprso) during the no-load state is equal to or larger than a previously derived allowable lock-up capacity limit value ($\alpha$) which corresponds to the shock determining lock-up capacity to determine whether a lock-up shock during the release of the accelerator pedal occurs when determining that the lock-up capacity (L/Uprso) during the no-load state is equal to or larger than the lock-up enable/disable determining lock-up capacity (L/Uprs).

8. A lock-up capacity control apparatus for a torque converter as claimed in claim 7, wherein the lock-up capacity control apparatus further comprises: an engine speed sensor to detect an engine speed (Ne); and a turbine revolution speed sensor to detect a turbine revolution speed (Nt) and the controller is configured to calculate a slip quantity ($\Delta N$) from the detected engine speed (Ne) and turbine revolution speed (Nt) and to determine whether the calculated slip quantity ($\Delta N$) is equal to or larger than a shock determining slip revolution ($\beta$) when determining that the lock-up capacity (L/Uprso) during the no-load state is equal to or larger than the previously derived allowable lock-up capacity limit value ($\alpha$).

9. A lock-up capacity control apparatus for a torque converter as claimed in claim 8, wherein the controller is configured to output the sequentially augmenting lock-up capacity to complete the lock up through a continuation of the augmentation of the lock-up capacity by means of the time series control when determining that the calculated slip quantity ($\Delta N$) is smaller than the shock determining slip revolution ($\beta$) ($\Delta N < \beta$).

10. A lock-up capacity control apparatus for a torque converter as claimed in claim 7, wherein the controller is configured to cause the torque converter to have the converter state through a lock-up release when determining that the lock-up capacity (L/Uprso) during the no-load state is smaller than the lock-up enable/disable determining lock-up capacity (L/Uprss) to determine that the lock-up capacity (L/Uprso) during the no-load state is a lock-up disable lock-up capacity.

11. A lock-up capacity control apparatus for a torque converter as claimed in claim 7, wherein the controller is configured to output the sequentially augmenting lock-up capacity to complete the lock up through a continuation of the augmentation of the lock-up capacity by means of the time series control when determining that the lock-up capacity (L/Uprso) during the no-load state is smaller than the previously derived allowable lock-up capacity limit value ($\alpha$) to determine that a lock-up shock during the release of the accelerator pedal does not occur.

12. A lock-up capacity control apparatus for a torque converter as claimed in claim 6, wherein the controller is configured to augment the lock-up torque capacity (L/Uprs) at a ramp gradient in accordance with a transmission torque of the torque converter by means of the time series control to perform the acceleration slip lock up when determining that the release of the accelerator pedal in order for the engine to be switched into the no-load state does not occur before the completion of the lock up for the re-acceleration and to determine whether the augmented lock-up capacity (L/Uprs) has reached to a value for the lock up to be completed to determine whether the lock up of the torque converter should be completed.

13. A lock-up capacity control apparatus for a torque converter as claimed in claim 12, wherein the controller is configured to output the sequentially augmenting lock-up capacity to complete the lock up through a continuation of the augmentation of the lock-up capacity by means of the time series control when determining that the augmented lock-up capacity has reached to the value for the lock up to be completed.

14. A lock-up capacity control apparatus for a torque converter as claimed in claim 12, wherein the controller is configured to determine whether a release of an accelerator pedal in order for the engine to be switched into the no-load state occurs during the acceleration slip lock up before a completion of the lock up for a re-acceleration when determining that the augmented lock-up capacity has not yet reached to the value for the lock up to be completed.

15. A lock-up capacity control method for a torque converter, the torque converter enabling a relative revolution between input and output elements of the torque converter to be limited and constituting a vehicular power train with a combination of an engine and an automatic transmission, the lock-up capacity control method comprising: causing the torque converter to have a converter state in which the relative revolution between the input and output elements of the torque converter is free of limitation in a case where a lock-up capacity (L/Uprso) during a no-load state when the engine is switched into the no-load state is equal to or larger than a shock determining lock-up capacity ($\alpha$), during an acceleration slip lock up in which the lock-up capacity of the torque converter is augmented by means of a time series control which accords with a load state of the engine, and causing the torque converter to be oriented toward a lock-up state in which the relative revolution between the input and output elements of the torque converter is zeroed by continuing an augmentation of the lock-up capacity by means of the time series control in a case where the lock-up capacity during the no-load state is smaller than the shock determining lock-up capacity ($\alpha$) during the acceleration slip lock up.

16. A lock-up capacity control apparatus for a torque converter, the torque converter enabling a relative revolution between input and output elements of the torque converter to be limited and constituting a vehicular power train with a combination of an engine and an automatic transmission, the lock-up capacity control apparatus comprising: first control means for causing the torque converter to have a converter state in which the relative revolution between the input and output elements of the torque converter is free of limitation in a case where a lock-up capacity (L/Uprso) during a no-load state when the engine is switched into the no-load state is equal to or larger than a shock determining lock-up capacity ($\alpha$), during an acceleration slip lock up in which the lock-up capacity of the torque converter is augmented by means of a time series control which accords with a load state of the engine; and second control means for causing the torque converter to be oriented toward a lock-up state in which the relative revolution between the input and output elements of the torque converter is zeroed by continuing an augmentation of the lock-up capacity by means of the time series control in a case where the lock-up capacity during the no-load state is smaller than the shock determining lock-up capacity ($\alpha$) during the acceleration slip lock up.

* * * * *